Jan. 13, 1959  S. V. JENNINGS ET AL  2,868,940
ELECTRONIC ARC-SUPPRESSOR
Filed Nov. 4, 1955  3 Sheets-Sheet 1

United States Patent Office 2,868,940
Patented Jan. 13, 1959

2,868,940

ELECTRONIC ARC-SUPPRESSOR

Sheldon V. Jennings, New Albany, Ind., and Sidney C. Smith, Louisville, Ky., assignors to Chemetron Corporation, a corporation of Delaware Application November 4, 1955, Serial No. 544,856

11 Claims. (Cl. 219—10.77)

This invention is concerned with methods of and systems for minimizing or preventing the formation of arcs between the heating electrodes of high-frequency heating systems of the type particularly adapted for the heating of dielectric work.

The problem of protecting the work and the circuit components against damage due to the formation of arcs between electrodes is not new. Nevertheless, there has been lacking, until the present invention, a system which acts with sufficient speed and reliability to overcome costly arc-damage. Though generally applicable to high-frequency heating systems and to high-frequency sources or oscillators, the importance of the present invention will be best appreciated by reference to a particular application of a high-frequency heating system.

Dielectric heating systems are particularly adapted to the molding, curing and processing of plastic materials. For example, one or both of the heating electrodes may comprise a die having on its face a simple, but more generally a fairly complex, design to be imparted to the plastic material. Dies which include patterns are expensive, and since thermoplastic materials faithfully reproduce the identations, protuberances and polished or roughened surface-portions, any impairment or damage to such surface will result in unacceptable final products. When the products are molded panels for automobiles or other components used in assembly lines, the loss of material though it may be substantial may not be as important as lengthy shutdown time.

Accordingly, it is highly important to minimize the formation of arcs which may not only damage the work but which also burn or otherwise mar and impair the surface of the dies. The minimum protection needed is to extinguish any arc which may form before it can damage the work, the dies, and the circuit components such as the plate transformer, the rectifier and the oscillator tubes. Such circuit components are not only expensive, but their failure inevitably results in loss of production during the shut-down time required for their replacement.

In accordance with the present invention, it has been found that such losses can be avoided almost entirely by providing a system which in response to an abnormal rate of change in the high-frequency voltage of the load circuit acts with such speed that in most cases arcing does not occur to any consequential degree. The abnormal rate of change of the high voltage of the load circuit is indicative of incipient arc formation, accompanied by heavy corona, and also occurs with the formation of an arc. The abnormal rate of change of voltage is a primary indication of the incipient formation of an arc. A high-speed protective system responsive only to said abnormal rate of change of said voltage of said load circuit interrupts the supply of power to the load circuit in a time interval so short that any arc which may appear is interrupted before it acquires an intensity which will damage the dies and the work. In contrast to reliance upon detection of a secondary effect, for example, a change in grid excitation, in accordance with the present invention a control signal is developed in response to the primary indication: specifically, the rate of change of said high-frequency voltage of the load circuit. The control signal is then applied immediately and without time delay to shut down the high-frequency generator.

In a preferred embodiment of the invention, upon occurrence of an abnormal rate of change in the high-frequency voltage between the heating electrodes, a circuit-opening control impulse is applied to one or more electric discharge devices or tubes forming part of the source of high-frequency energy to bias such tubes to cut-off. Such tubes instantly open the circuits of which they form a part. Thus, the tubes themselves are utilized as circuit interrupters or shut-off switches to discontinue, without consequential time delay of any kind, the delivery of high-frequency power to the load circuit, and more particularly to prevent undue rise in currents and voltages in the circuitry and to prevent the appearance of other transients and the like which are incident to arcing and which have been responsible for damage to, and failure of, components of the high-frequency generating system.

In accordance with a further aspect of the invention, a control signal or impulse which opens the anode circuit is made to persist for a time interval to maintain the supply of anode current interrupted so that the source of high-frequency energy remains deenergized for a short time interval and sufficient to assure avoidance of the formation of an arc which would otherwise occur upon immediate resumption of the dielectric heating cycle. During the short interval of deenergization of the high-frequency source, the protective system is conditioned and made effective for delivery of another control impulse in the event an arc occurs after the heating cycle has been resumed.

For further objects and advantages of the present invention, reference may be had to the following detailed description taken in conjunction with the accompanying drawings, in which.

Figure 1:
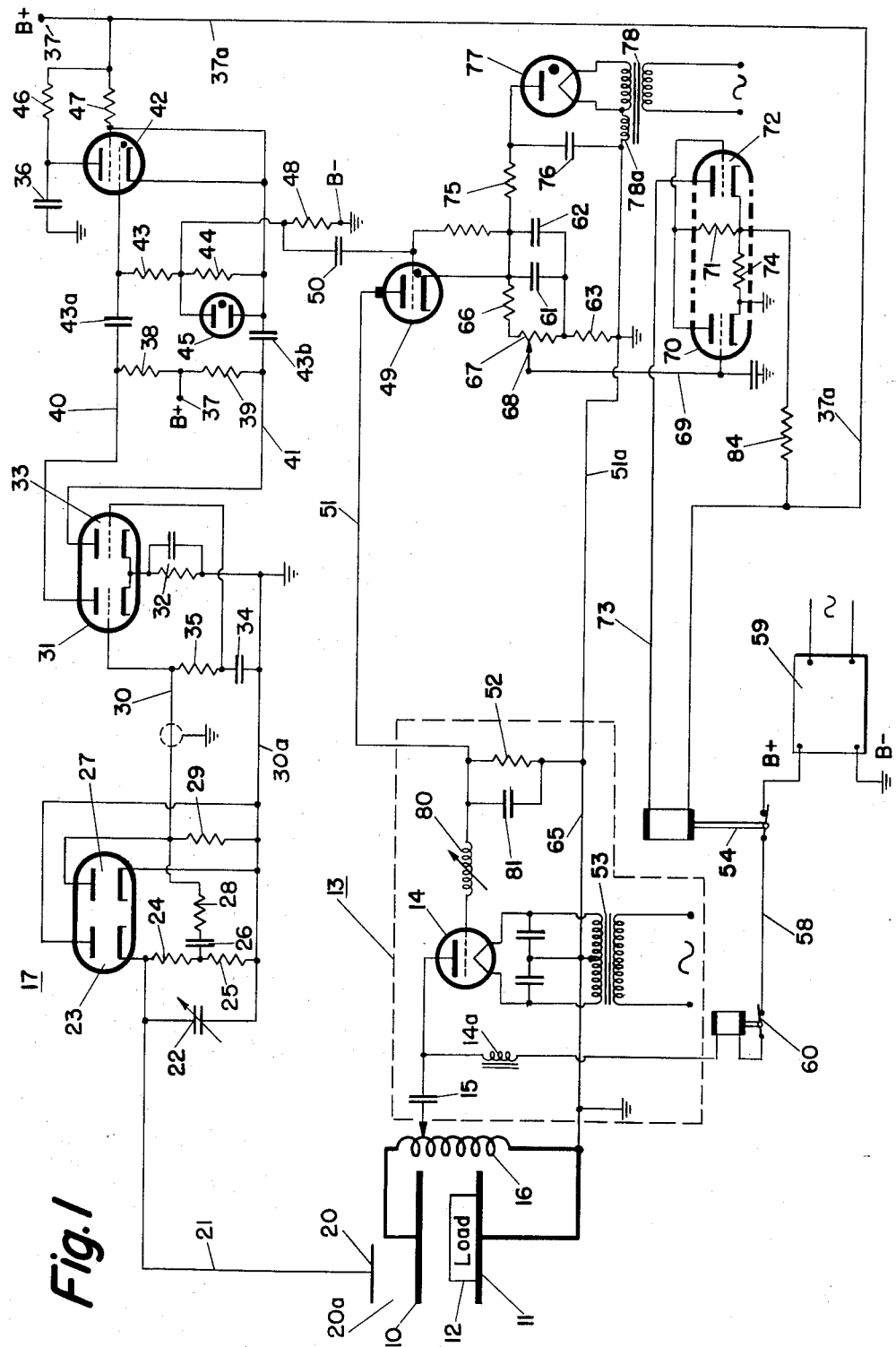
Fig. 1 is a wiring diagram which schematically illustrates a high-frequency heating system embodying the protective system of the present invention.

Referring to Fig. 1, the invention in one form has been shown as applied to a high-frequency dielectric heating system including heating electrodes 10 and 11 arranged in spaced relation to accommodate between them a load 12. The load, which may comprise workpieces of dielectric material, is effectively heated when subjected to the high-frequency, high-voltage electric field produced between the electrodes 10 and 11. Inasmuch as the heating of the load increases as the square of the voltage between electrodes 10 and 11, it is desirable to have that voltage as high as possible to shorten the length of time the load is between the electrodes to bring it to a desired temperature or to a desired condition of dryness. However, as the voltage across or between the electrodes 10 and 11 is increased, there is likelihood of electrical breakdown of the air or atmosphere between the electrodes with the resultant production of corona discharge and formation of arcs. Even if the voltage between electrodes 10 and 11 be reduced to or maintained at a value which will normally be "safe" from the arc-prevention standpoint, arcs may be and frequently are formed. If, as loads 12 are changed, foreign objects are brought between the electrodes, arc damage may occur. Such foreign objects may take the form of iron filings, metal staples, tacks or other parts used in the fabrication of parts such as automobile trim panels. Such a metal object not only decreases the spacing between the electrodes but it also produces a non-uniform distribution of the electric field between the electrodes. The increased potential difference between the electrodes in the region of the metal object may produce immediate heavy corona and incipient arcing. If an arc should then form between the electrodes 10 and 11, there will be a burning or degradation of the load 12 disposed between them; and where electrode dies are employed, there may occur a pitting of the dies, thus rendering them useless for further application and use. Transients, heavy currents and other disturbances in the generator or source of high-frequency energy may be produced as a result of the arc with resultant damage to and failure of costly components.

In accordance with the present invention, a protective system is provided which operates instantaneously or concurrently with the appearance of heavy corona, incipient arcing, or of an arc between the electrodes 10 and 11 for shutting off the supply of high-frequency power to the load. In the preferred form of the invention, one or more stages of the source of high-frequency energy are utilized as a circuit-interrupting means to shut off the delivery of high-frequency power to the load circuit.

The details of the particular power generator or source of high-frequency energy 13 and the manner of its operation will be later explained in detail. It is representative of sources of high-frequency energy of many different and varied types including one or more stages, any one of which may be utilized in accordance with the present invention to interrupt the supply of high-frequency energy to the load circuit. As shown, the high-frequency source 13 includes a power tube 14. The tube 14, of the thermionic type having the customary electrodes therein, supplies power through a coupling capacitor 15 to a tank circuit which includes the inductance of an inductance element or coil 16 and the capacitance between the electrodes 10 and 11.

In accordance with the present invention, a detector or sensing means 17 is at all times electrically connected to the heating electrodes 10 and 11 and is at all times responsive to the magnitude of the voltage therebetween for producing a distinctive signal upon the occurrence of any incipient arcing condition, or corona, or arcing, between the electrodes. The detector 17 has its input connected to the heating electrodes 10 and 11 by way of a voltage-dividing circuit which includes a capacitor 22 and a second capacitor 20a formed by a capacitor plate 20 in spaced relation to the high-voltage electrode 10. The voltage between the electrodes 10 and 11 is applied to the input circuit of detector 17 by way of the capacitor 20a, conductor 21, and the capacitor 22 which is connected through the ground path to the heating electrode 11. The voltage across the heating electrodes divides between capacitors 20a and 22 inversely as their capacitance.

In one embodiment of the invention, for a heating voltage between electrodes 10 and 11 of the order of 3,000 volts, the capacitor 22 was selected to be large (of the order of 30 micromicrofarads) relative to capacitor 20a (of the order of from 0.1 to 1.0 micromicrofarads). Thus, only a small fraction of the heating electrode voltage is applied to the input circuit of the detector 17. The fraction of the heating voltage applied to the detector 17 may be varied by the position of capacitor plate 20 relative to the electrode 10 and by adjustment of the capacitor 22 which is included in the input circuit of the detector. The voltage across the capacitor 22 is applied to a diode 23 and to voltage-dividing resistors 24 and 25.

Figure 3:
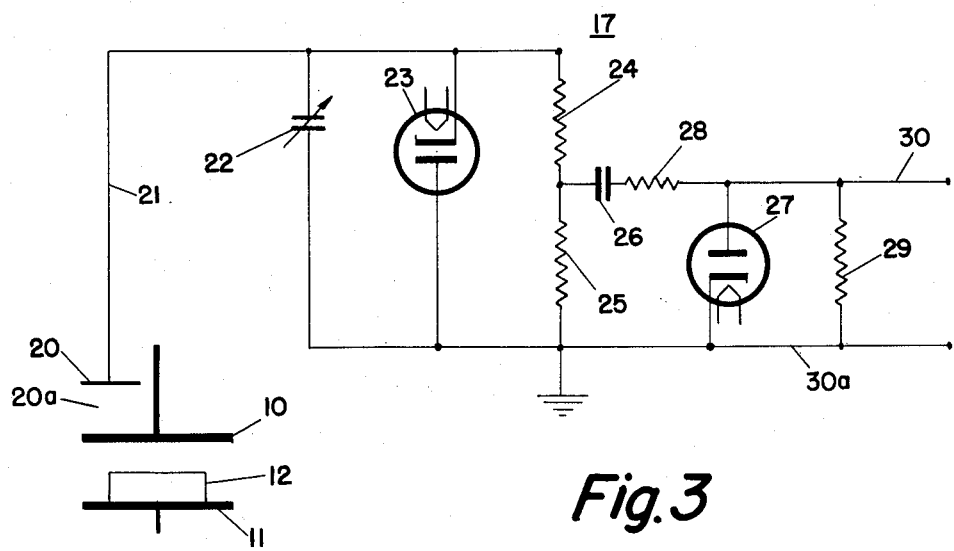
Fig. 3 is a wiring diagram of a part of Fig. 1 but drawn in a way better to illustrate the manner in which a fraction of the high-frequency potential at the heating electrodes is rectified and a signal produced.

The manner in which the detector 17 functions will be more readily understood by referring to Fig. 3. The diode 23 serves as a shunt detector for producing unidirectional or rectified current flow through the resistors 24 and 25. The magnitude of the current flow will be dependent upon the voltage developed across capacitor 22 and applied to the diode 23. The direction of flow of unidirectional current through resistors 24 and 25 depends upon the polarity of connection of the diode 23 across the input circuit. As shown, for positive half cycles of current flow, as when conductor 21 is positive relative to ground, current will flow from conductor 21 through resistors 24 and 25 to ground. For such positive half cycles, the diode 23 presents a high impedance since its cathode is then positive with respect to its anode. However, for the negative half cycles the impedance or resistance of the diode 23 is of a low order compared with that of the path through resistors 24 and 25. Hence, current flow during the negative half cycles is by way of the diode 23 to the exclusion of the circuit including resistors 24 and 25.

During operation of the dielectric heating system, the spacing between the electrodes 10 and 11 may be varied, by moving one of them relative to the other, or preset, to accommodate work-loads of differing size. Such change in spacing will vary the voltage between them. A change in the load 12, both as to weight and in respect to its electrical characteristics, such as the loss factor, will also produce a different loading of the high-frequency generator and a possibly different voltage between the electrodes. Load changes of this type also occur when suitable means, such as a conveyor-forming electrode 11, are provided for continuous processing of work moved through the heating space between electrodes 10 and 11.

In accordance with the present invention, the detector 17 does not produce an effective output signal during normal changes of voltage between the electrodes, and there is no interference with normal operation of the system. However, in the event of incipient arc production between the electrodes, and certainly upon the occurrence of an arc, there is produced by detector 17 an output signal of distinctive character, i. e., of substantial magnitude which in a manner hereinafter described causes an immediate interruption in the supply of high-frequency power to the load circuit.

Due to the unidirectional current flow through the resistor 25, a potential difference is developed of magnitude which varies with the magnitude of the voltage across the heating electrodes 10 and 11. The polarity of the voltage across the resistor 25 is such that the junction between resistors 24 and 25 is positive with respect to ground. Connected in shunt with the resistor 25 are serially-connected a capacitor 26, a resistor 28 and an output resistor 29 which, with diode 27, form a network known as a clamping circuit operating in the following manner to produce a signal pulse concurrently with incipient arcing, corona formation or arcing between the heating electrodes.

During normal operation of the dielectric heating system, the capacitor 26 is fully charged to a value equal to the unidirectional potential difference across the resistor 25. No current then flows through the series circuit and the output voltage cross the resistor 29 is effectively zero. Upon the occurrence of arcing between the heating electrodes 10 and 11, or incipient arcing as evidenced by excessive corona, there will be a sharp decrease in the voltage across the electrodes which produces a sharp decrease in the magnitude of the unidirectional voltage across the resistor 25. The greater the rate and extent of reduction of electrode voltage, the greater will be the output voltage developed across output resistor 29. It is emphasized that such an output voltage appears concurrently with the voltage change at the heating electrodes 10 and 11 since a reduction in one voltage, the potential difference across resistor 25, makes the other source of voltage, the potential difference across capacitor 26, effective immediately to produce an output voltage across output resistor 29. The output voltage appears as a negative signal pulse between the conductor 30 and the conductor 30a.

Before describing the manner in which the output voltage or signal pulse across resistor 29 is used to bias the tube 14 to or beyond cut-off, a further function of the circuit will be described. Assuming a slowly changing electrode voltage, there will likewise be a slowly changing voltage across resistor 25. With any change of that voltage, the capacitor 26 will be charging or discharging depending upon the direction of the voltage change. With a slowly decreasing electrode voltage, the capacitor 26 will discharge through a circuit including resistors 25, 29 and 28, the time constant of which is selected so that the potential difference across, or the charge of, the capacitor 26 closely follows the change in potential difference across resistor 25. Thus, only a small potential difference will appear across resistor 29.

When the potential difference across the resistor 25 is higher than that across the capacitor 26, the diode 27 conducts current to complete a low-impedance charging circuit which may be traced from the upper end, Fig. 3, of resistor 25 through the capacitor 26, resistor 28, diode 27 and to the lower end of resistor 25. Since substantially all current flow is then by way of diode 27 in preference to the higher impedance path through resistor 29, the resistor 29 does not develop an output voltage of any consequential magnitude. Since increasing or positive excursions of the electrode voltage as developed across resistor 25 do not appear across resistor 29, the detector 17 may be said to be selective as between a sudden voltage rise at the heating electrodes (an output signal is not produced) and a sudden voltage decrease on the load circuit which produces the large signal pulse across resistor 29.

The foregoing provisions are particularly useful in connection with high-frequency generators in which transients develop during starting. Such transients generally result in a high electrode voltage of short duration. As the grid-leak bias developed across resistor 52, Fig. 1, stabilizes, the electrode voltage decreases to its normal operating value. By suitable selection of values, the time-constant of the charging circuit, including capacitor 26, resistor 28 and diode 27, is made long compared with the duration-time of such transients. Accordingly, capacitor 26 does not charge to the peak voltage developed across resistor 25 from such transients. Thus, when the electrode voltage decreases from its higher transient excursion-value, the voltage across capacitor 26 is insufficient to produce a signal pulse across conductors 30 and 30a.

Referring to Fig. 1, the manner in which the output signal pulse developed across resistor 29 is utilized will now be described. It is preferably applied by way of shielded conductor 30 and ground-conductor 30a to a discriminating circuit including a balanced amplifier which produces a control signal of large magnitude whenever there is an excessive or abnormal change of voltage between electrodes 10 and 11. It is to be observed that the signal appearing across resistor 29 is directly, conductively, and without time delay, applied to the first stage 31 of the amplifier. In other words, the grid of stage 31, shown as a triode, is conductively connected to conductor 30 leading to one side of resistor 29 with the cathode conductively connected through a grid-cathode biasing circuit 32 and by conductor 30a to the other side thereof.

The second amplifying stage 33 is not connected directly across resistor 29. That stage 33, also shown as a triode, has included in its input a time-delay circuit of the integrator type. The input signal applied between grid and cathode of stage 33 is that developed across the capacitor 34. In series with capacitor 34 is a resistor 35 of a size in relation to capacitor 34 materially to attenuate and to delay the application to the input circuit of stage 33, the signal pulse applied to them by way of conductors 30 and 30a. While attenuated and delayed in its application to stage 33, the signal pulse is fully and immediately applied to the first stage 31. Depending upon the polarity of the control signal or pulse, already described as negative, one of the stages, i. e., the stage 31, is made less conductive than the other. Accordingly, as soon as said signal pulse appears across resistor 29, an output signal of large magnitude is concurrently produced across output conductors 40 and 41.

That output signal is produced as follows. Since the anodes of the stages 31 and 33 are supplied from a source of anode potential 37 by way of resistors 38 and 39, the reduced current flow through stage 31 produces a substantial rise in voltage at the conductor 40 relative to conductor 41.

The time constant of the delay or integrating circuit, including resistor 35 and capacitor 34, is such that the potential on the capacitor 34 will follow small potential changes across resistor 29 produced during normal operation of the dielectric heating system. Hence, during normal operation, including adjustment in the spacing of the electrodes 10 and 11, any output signal developed between conductors 40 and 41 will be negligible. However, by reason of the delay circuit 34, 35, the response of the balanced amplifier will vary with the rate of change of the electrode voltage as reflected by the change in potential difference across resistor 29. The greater the rate of change, the greater the difference in the conductivity between stages 31 and 33, and the greater will be the output signal. The amplifier including stages 31 and 33 may, therefore, be considered as a rate-responsive amplifier. It increases the amplitude of the signal pulse from detector 17 and discriminates against unwanted signals such as power-supply ripple. It also acts as a pulse-shaping means for development of a signal pulse between conductors 40 and 41 which assures the "firing" of a thyratron type of control tube 42.

Since the output signal pulse from detector 17 is produced upon an abnormal rate of change of voltage at the heating electrodes 10 and 11, that pulse may in some cases be used directly to render a stage of the high-frequency source 13 non-conductive to interrupt the supply of high-frequency (HF) energy to them. The same use may be made of the amplified pulses developed by the rate-responsive amplifier 31,33. However, the output from the rate-responsive amplifier is preferably utilized to control the firing of one or more thyratron type of tubes. As shown, a first thyratron 42 is used to control a second thyratron type of tube 49. By providing a trigger circuit including the tube 42 and associated circuits, a control pulse or signal of adequate magnitude is produced to fire the tube 49, which is of a type requiring a large pulse to render it conductive.

The tube 42 may be either of the GL-5727 or 2D21 type, both being gas-filled and the GL-5727 having an extra-duty rating. Coupling capacitors 43a and 43b are included in the control circuit of tube 42. Whenever a signal pulse appears across conductors 40 and 41, it is applied by way of the coupling capacitors between the grid and cathode of tube 42. The input circuit also includes a grid resistor 43 and a cathode-biasing resistor 44, shunted by a regulator type of tube 45 of the neon-tube type. The anode and shield grid of tube 42 are connected respectively through resistors 46 and 47 to the positive or B+ conductor of a suitable source 37 of anode potential. A normally negative bias potential for the grid of tube 42 is developed by a voltage-divider including resistors 44 and 47. The circuit through said resistors extends from B+ and the source-conductor 37 by way of resistor 47, the conductive connection to the cathode, the bias resistor 44 and by way of resistor 48 to the other side, B—, of the source 37. The potential difference developed across resistor 44 maintains the grid of tube 42 negative with respect to its cathode and thus maintains the tube non-conductive until there is applied to its input circuit a positive signal pulse from amplifier 31, 33.

During normal operation, the neon-tube 45 is non-conductive since the potential difference, of the order of 6 volts, across resistor 44 is insufficient to render tube 45 conductive. When the tube 42 fires, the voltage across resistor 44 rises and tube 45 is rendered conductive to provide a discharge path of decreased resistance through tube 42 and resistor 48.

Upon firing of the tube 42, a surge of current flows through it and through resistor 48 by reason of the additional provision of capacitor 36 which carries a charge equal to the potential difference or voltage of the source 37 of anode potential. The resistor 46 has a sufficiently high resistance to limit the current flowing through the circuit, including resistor 46, the tube 42 and resistors 44 and 48, to a value which will be insufficient to maintain ionization of the tube 42.

Accordingly, as soon as the capacitor 36 has discharged, current flowing by way of resistor 46 is insufficient to maintain the tube 42 conductive. As it and tube 45 return to their non-conductive conditions, current flows by way of resistor 46 to re-charge the capacitor 36 to condition the trigger circuit of the protective system for a second operation.

The principal resistance in the discharge path is resistor 48. It has a value for development of a high-voltage impulse, well in excess of 130 volts. The high-valued impulse is applied by coupling capacitor 50 to the input circuit of the second control tube 49, which in one embodiment of the invention was of the AX–9911 type, an extra-duty 4C35 thyratron tube.

Though a permanent source of anode voltage may be provided for tube 49, such as from a conventional rectifier system, the system of Fig. 1 utilizes a source of stored electrical energy such as one or more charged capacitors. Thus when tube 49 fires, electrical energy stored in capacitors 61 and 62 produces current flow through the grid resistor 52 of tube 14 of magnitude and direction to bias that tube to and beyond cut-off. The tube is effective instantly to interrupt the supply of high-frequency power to the heating electrodes 10 and 11. In this manner the power tube 14 itself serves the function of interrupting the supply to the high-frequency load circuit including electrodes 10 and 11. Thus, the power tube 14, an electronic discharge device, is utilized not only for the delivery of high-frequency power to maintain high-frequency oscillations within the tank circuit, but it is utilized also as an electronic switch or circuit-interrupter to shut off the power to the tank circuit upon the occurrence of incipient or actual arcing conditions. The tube 14 also interrupts the direct-current anode supply circuit which includes the R. F. choke coil 14a.

The discharge circuit for the capacitors 61 and 62 may be traced from the positive side thereof by way of resistor 63, conductor 51a, grid-leak resistor 52, and by way of the thyratron 49 to the other side of them. Because the energy-storing means comprising capacitors 61 and 62 represents a temporary source of supply, the tube 14 is maintained non-conductive by the negative bias developed by resistor 52 only during the period of adequate current flow through that resistor. With a permanent source of supply, the tube 14 can be maintained non-conductive as long as may be desired.

To provide continued protection against an immediately recurring arc, which might appear if the heating cycle were to be resumed as capacitors 61 and 62 are discharged, additional provisions are made to maintain interrupted the supply of high-frequency power to the electrodes 10 and 11 after discharge of the capacitors. As will be later explained in detail, the relay or contactor 54, normally closed by current flow through its operating coil and a tube 72, is deenergized and operates to its open position during the time tube 14 is maintained non-conductive by the discharge current supplied by capacitors 61 and 62.

A more detailed consideration of the circuitry including the capacitors 61 and 62 will now be presented. The energy stored in the capacitors 61 and 62 is supplied by a charging circuit which includes a series-resistor 75, a filtering capacitor 76 and a rectifier or diode 77. The diode 77 is supplied from a transformer 78 having the usual filament windings and an anode supply winding 78a connected in the charging circuit. This circuit may be traced from the left-hand side of the winding 78a by way of the resistor 63, the capacitors 61 and 62, the resistor 75 and by way of the diode 77 to the other side of the transformer winding 78a.

The series resistor 75 has a value which limits the magnitude of the charging current to a value which will not maintain the thyratron 49 conductive. Accordingly, after it fires and the capacitors 61 and 62 have been substantially discharged, the thyratron 49 ceases to conduct. As soon as it becomes non-conductive, the charging circuit is effective to initiate the re-charging of the capacitors 61 and 62. The relay 54 is maintained in its open position until sufficient energy has been stored in the capacitors to assure effective protection of the system in the event of incipient arcing upon resumption of the high-frequency heating cycle.

Returning now to the operation of the relay 54, it will be remembered that it is normally energized to close the anode-supply circuit of power tube 14. The coil of relay 54 is energized by reason of the flow of current from the source of supply 37 by way of conductor 37a, the operating coil of the relay 54, conductor 73, the tube or amplifying stage 72, which may be one-half of a heavy-duty 6SN7 type of tube, and thence by way of resistor 74 to ground, which is the other side of the anode supply.

The tube 72 is conductive in the absence of current flow through resistor 71 since the grid is not then biased to cut-off. More specifically, in the absence of current flow through resistor 71, the grid of tube 72 will be at the same potential as its cathode, a condition for conduction by tube 72. The magnitude of current flowing through tube 72 is determined by the voltage-dividing resistors 84 and 74. These resistors determine the potential of the cathode of tube 72 relative to the anode. The current flow through the coil of contactor 54 and the tube 72 is limited to a value which will close the contactor 54 and which will hold it in closed position.

The tube 70 has its grid negatively biased relative to its cathode by reason of the grid connection to the tap 68 of the voltage-divider formed by resistors 66, 67 and 63, the latter resistor having its lower end connected to the ground path to which the cathode of tube 70 is directly connected. The resistor 63 is small compared with resistors 66 and 67. It is incorporated to accelerate the deenergization of relay 54.

It will be recalled that when the thyratron 49 fires, the discharge circuit included resistor 63. The potential difference resulting from current flow through the resistor 63 makes its upper end positive relative to ground. This cancels the negative potential between tap 68 and the top of resistor 63. The result is immediate removal of the negative bias on the control grid of the tube 70. The removal of this negative bias from the input circuit of the tube 70 allows anode conduction of that tube by way of resistors 84 and 71. The resultant voltage drop across resistor 71 makes the grid of tube 72 negative with respect to its cathode so as to reduce the flow of the current through tube 72. In this manner, the current is reduced below the hold-in value of contactor 54 which immediately opens to interrupt the anode supply of the power tube 14.

There will now be described the manner in which the high-frequency heating cycle is automatically resumed. As the capacitors 61 and 62 are charged, the voltage across resistor 67 rises. It rises to a value which biases the tube 70 to cut-off as the level of charge of capacitors 61 and 62 rises to a circuit-protecting level. As the tube 70 is made non-conductive, current flow through resistor 71 is reduced to zero and the potential drop across resistor 71 disappears. The result is that the potential on the grid of tube 72 again rises to that of the cathode. The tube 72 conducts with flow of current to energize the operating coil of contactor 54 to reclose it and, in the illustrated embodiment, to initiate a further cycle of heating by the dielectric heating system. Alternatively, the system may be set up for manual initiation of such further heating cycle, as by suitable contactors provided in supply means 59.

From the foregoing, it will be seen that upon occurrence of corona or flash-over, the system operates immediately to interrupt the flow of power to the load circuit. The operation is positive and certain by reason of the several stages of amplification and the large pulses produced which immediately shut off the power tube 14.

Figures 5, 6:
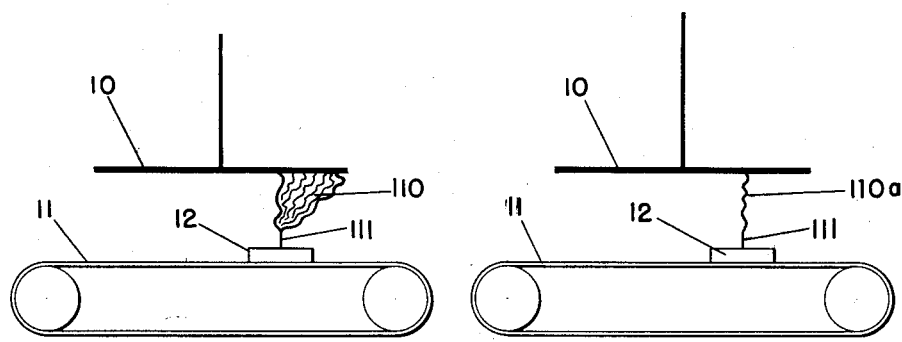
Figs. 5 and 6 illustrate electrodes under conditions of arc formation and respectively with a system not embodying the present invention and one which does.

Reference may now be had to Figs. 5 and 6 which are based respectively upon actual photographs taken with and without the present invention incorporated in the dielectric heating systems, all other conditions of operation being the same. Fig. 6 illustrates the effectiveness of the present invention in suppressing arc formation. Fig. 6 is to be compared with Fig. 5. In Fig. 5, the arc 110 extending between a nail 111 driven into the work 12 and the upper electrode 10 is large and of extended area and of long duration. The work 12 is supported on the lower electrode 11, shown in the form of a conveyor for transport of the work beneath the upper electrode 10. The nail 111 is representative of foreign objects with sharp points which produce conditions favorable to the formation of an arc. An arc like that shown in Fig. 5 of large size, extensive area, and high energy content produces intensive heating, pitting, and injury to polished dies and the like which may be utilized for the upper electrode 10.

In contrast with the foregoing, in Fig. 6 the protective system functions with such speed, when heavy corona occurs, to interrupt the power supply before there is build-up of the arc to more than the faint spark indicated at 110a. A spark of low intensity and of low energy content is not likely to cause any injury to the work and certainly not to the electrodes.

It has already been mentioned that the present invention is applicable to high-frequency generators generally and that the one illustrated is to be taken as exemplary. It has been illustrated because its operation is relatively easy to understand. In the embodiment of Fig 1, the capacitance between the plates 10 and 11 and the inductance of the element 16 not only form the tank circuit but they also form the frequency-determining circuit of the oscillator. The radio-frequency portion of the grid circuit of the tube 14 includes an inductance 80, one terminal of which is connected to the grid of the tube 14 and the other terminal of which is effectively at ground or cathode potential by virtue of the capacitor 81 connected in shunt with the grid-leak resistor 52. The oscillator is of the so-called TNT type, that is to say, it has a tuned plate circuit, but the grid circuit is not tuned. The inductance 80 is selected so that in association with the distributed capacities of the circuit it is resonant to a somewhat higher frequency than the load circuit. The coupling between the grid circuit and the load circuit is provided by the inherent capacity between the grid and anode elements of the tube itself. It is to be understood that magnetic coupling, of course, may be utilized and that high-frequency generators of the type shown in Wilson Patent 2,684,433, as well as others, may be used in place of the high-frequency generator 13 of Fig. 1.

The following typical values of the circuit components for the embodiment of the invention of Fig. 1 are to be taken as illustrative and not by way of limitation.

| | |
|---|---|
| Capacitor 26 | 0.001 microfarad. |
| Capacitor 34 | 0.001 microfarad. |
| Capacitor 36 | 0.05 microfarad. |
| Capacitors 61, 62 | 4 microfarads (each). |
| Resistor 24 | 22,000 ohms. |
| Resistor 25 | 33,000 ohms. |
| Resistor 29 | 330,000 ohms. |
| Resistor 35 | 100,000 ohms. |
| Resistor 38 | 22,000 ohms. |
| Resistor 39 | 22,000 ohms. |
| Resistor 52 | 2,000 to 10,000 ohms. |
| Resistor 63 | 15 ohms. |
| Resistor 71 | 10,000 ohms. |
| Resistor 74 | 5,000 ohms. |
| Resistor 75 | 230,000 ohms. |
| Resistor 84 | 5,000 ohms. |

The remaining circuit components are conventional and have conventional values adapted for the particular type of tubes.

Further in connection with Fig. 1, the inclusion of the overload relay or circuit breaker 60 in the power supply circuit is to be taken as symbolic of any suitable overload protection such as normally associated with a high-frequency generator. Thus, the present invention can be applied to conventional systems as additional protection for the generator and not entirely in substitution for presently used protective systems.

It is to be further understood that where the high-frequency generator includes additional electronic discharge devices or tubes for controlling the flow of high-frequency power to the load circuit, the circuit-interrupting bias may be applied to any of the tubes which will interrupt the flow of high-frequency power to the heating electrodes.

When the oscillator has an independent and permanent source of grid bias, i. e., is not self-biasing, it may not be necessary to include the contactor 54 for the reason that after the tube 14 is biased to beyond cut-off by the control pulse developed after firing of the thyratron 49, the tube will not again oscillate due to the negative bias maintained on its grid by its permanent source of bias potential.

It is also to be understood that a high negative pulse need not always be applied to an oscillator tube in order to have it function as a circuit-interrupting device. Some tubes will effectively interrupt the circuit if the grid circuit be opened and/or connected to cathode or ground potential. In such instances, the control impulse may operate a high-speed relay to effect the foregoing change in connections of the grid circuit. Such a system is shown in Fig. 2.

Figure 2:
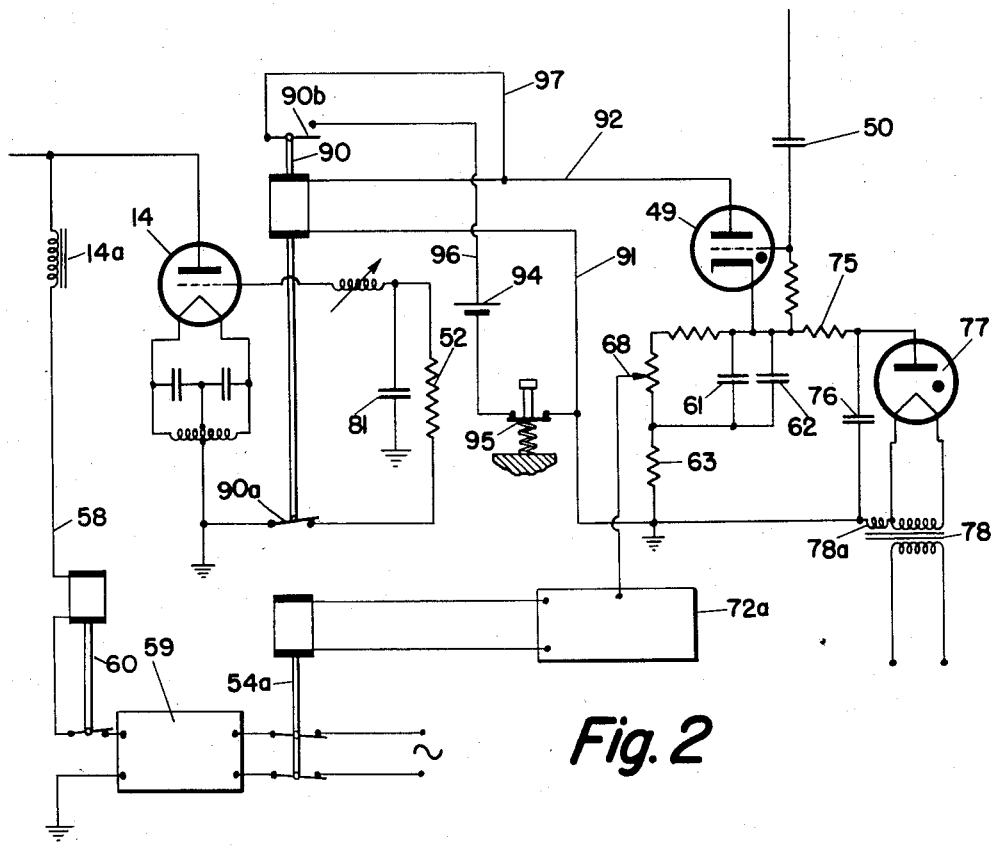
Fig. 2 is a partial wiring diagram of Fig. 1 but which schematically illustrates a modification of the protective system.

In the modification of Fig. 2 it is to be understood that the load circuit is the same as in Fig. 1. In Fig. 2, the control circuit for interrupting the operation of the power tube 14 upon the occurrence of corona or arcing between the heating electrodes 10 and 11, Fig. 1, includes a high-speed relay 90, Fig. 2, having contacts 90a included in the grid circuit of tube 14. Upon the occurrence of an arc between the heating electrodes 10 and 11, the thyratron tube 49 conducts to energize the operating coil of relay 90 to open contacts 90a, thus to interrupt the operation of tube 14 by opening the grid-excitation circuit. The energizing circuit for relay 90 may be traced from the positive side of capacitors 61 and 62, resistor 63, conductor 91, the operating coil of relay 90, conductor 92, tube 49 and thence to the negative side of capacitors 61 and 62.

The opening of the grid circuit of tube 14 blocks the tube and immediately interrupts the high-frequency power delivery to the load circuit, thus quenching the arc and protecting the system components and the load from damage.

Similar to the embodiment of Fig. 1, and for the same reasons hereinbefore discussed in connection with relay 54 of Fig. 1, there is included in Fig. 2 a second means operable upon occurrence of arcing between electrodes 10 and 11 for disabling the operation of the power source which supplies energy to the heating electrodes. In Fig. 2, such a means comprises the relay 54a having contacts in the power supply input circuit to the source of plate supply illustrated by the rectangle 59. The operating coil of relay 54a is connected in a manner like that of the operating coil of relay 54 of Fig. 1, that is, to the plate-cathode circuit of the tube 72. In Fig. 2, the tube 72 and its associated components are represented by the rectangle 72a.

When it is desirable to maintain the supply of power interrupted for a period longer than that normally provided by the operation of the arrangement above described, a holding circuit may be provided for the relay 90, Fig. 2, to maintain the relay energized for an indefinite period. A suitable circuit has been illustrated as including back contacts 90b of the relay 90 which are closed upon energization of the relay. The holding circuit may be traced from one side of a battery 94 by way of conductor 96, back contacts 90b, conductor 97, the operating coil of relay 90, conductor 91, push-button switch 95, and thence to the opposite side of battery 94. The push-button switch 95 is actuated to break the holding circuit to deenergize relay 90 and to close contacts 90a. During the interval of time which the holding circuit is effective, the capacitors 61 and 62 will have been charged in the manner described in connection with Fig. 1 so that the system will be effective to protect the oscillator 13 should an arc again form between the heating electrodes 10 and 11.

Figure 4:
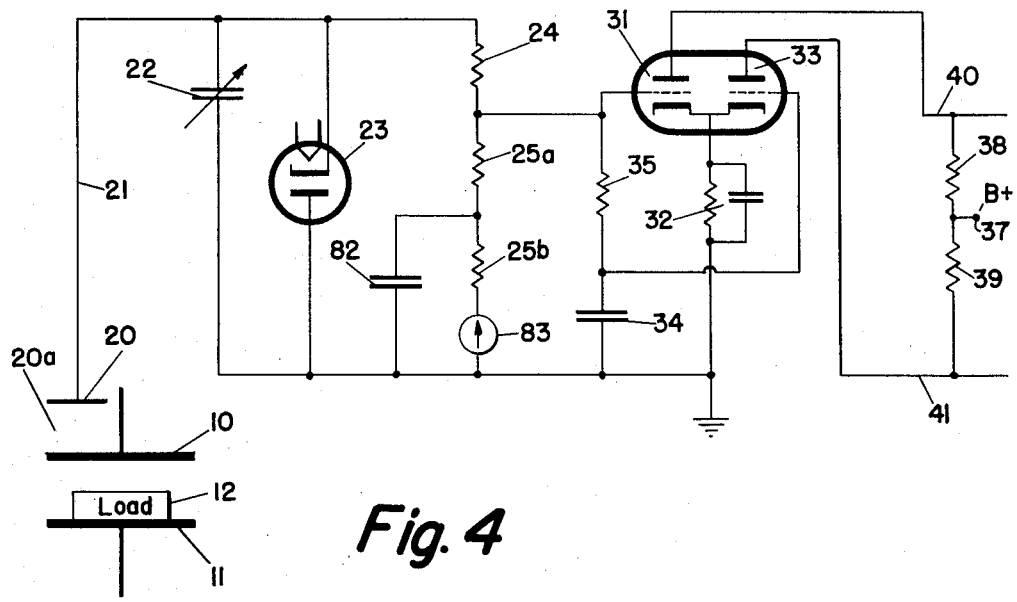
Fig. 4 is a partial wiring diagram of Fig. 1 and schematically illustrates a modification of the invention which is of somewhat simpler form than the protective system of Figs. 1 and 3.

Referring now to Fig. 4, it will be observed that the portion of the detector circuit shown in Fig. 3 has been simplified by omission of the second diode 27, the resistors 28 and 29, and the capacitor 26. The operation of Fig. 4 is generally similar to that of Fig. 3. A fractional part of the voltage across electrodes 10 and 11 is applied to the capacity divider including capacitors 20a and 22. The unidirectional voltage appearing across resistors 25a and 25b is applied to the input circuit of the balanced amplifier or discriminator circuit including the stages 31 and 33. A high-frequency by-pass capacitor 82 provides a low-impedance path for high-frequency current around the resistor 25b and a meter 83 which deflects in proportion to the voltage between electrodes 10 and 11. The meter 83 may have a scale calibrated in terms of the voltage across the heating electrodes 10 and 11.

In the modification of Fig. 4, the rate-responsive balanced type of amplifier 31, 33 is depended upon to produce an output signal across output conductors 40 and 41, in response to an abnormal rate of change of the electrode voltage. As in Fig. 1, when the voltage applied to the grid circuits is slowly changing, as during normal operation of the dielectric heating system, the current flow through the tubes 31 and 33 is approximately equal and there is no potential difference between conductors 40 and 41. Upon a change of electrode voltage, the potential difference between conductors 40 and 41 will have a magnitude dependent upon the rate of change: with the appearance of corona or arc-over, a large and adequate potential difference or signal will appear for immediate operation of the control tube 42, Fig. 1, concurrently to interrupt the flow of high-frequency energy to the load circuit.

The time constant of the RC circuit including resistor 35 and capacitor 34 is sufficiently short to permit the grid of tube 33 to follow rather closely a change in potential of the grid of tube 31 with change in position of electrode 10 and with the change in loading of the work 12 between the electrodes. However, with the abnormal conditions, such as an arc occurring, the time constant is relatively long and adequate for a large differential in grid voltages for production of the control pulse across conductors 40 and 41. While the circuit of Fig. 3 is to be preferred, the circuit of Fig. 4 is illustrative of modifications which may be made within the spirit and scope of the invention.

The advantage of the system of Fig. 3 over Fig. 4 is that the inclusion of the clamping and time-delay circuit, including capacitor 26, diode 27 and resistors 28 and 29, makes the system unresponsive to transients of short duration when they occur upon the initiation of a heating cycle.

While it has now been made clear that numerous modifications of the invention may be made within the scope of the appended claims, nevertheless the arrangement of Fig. 1 has several advantages which will be briefly summarized. By utilizing diode 27 in the manner best shown in Fig. 3, the output signal developed across resistor 29 upon occurrence of incipient arcing is dependent upon rate of change of the electrode voltage and is relatively independent of the magnitude of electrode voltage developed across input capacitor 22. Thus, the output voltage in the form of a signal impulse is effective through the rate-responsive amplifier 31, 33 to cause the firing of the gas-filled tube 42 when the rate of change of decreasing electrode voltage is abnormally high as in the case of corona or arcing. The gas-filled tube 42 is then operative to "fire" the thyratron 49 which establishes the needed low-resistance discharge path for the storage means including capacitors 61 and 62. The discharge through the grid resistor 52 renders the power tube 14 non-conductive. The tube 14 then functions as an electronic switch to open the high-frequency power supply circuit.

What is claimed is:

1. A system for protecting a dielectric heating system and its electronic discharge means from effects of arcing and incipient arcing between the heating electrodes of said heating system, comprising sensing means electrically connected to the heating electrodes and responsive to the voltage between the electrodes for producing an output signal which changes concurrently with change in the voltage between said electrodes, a rate-responsive amplifier of the normally balanced output type and having separate input circuits to separate stages thereof, time-delay means in one only of said input circuits, circuit-means for applying said output signal to said input circuits, said time-delay means in response to an abnormal rate of change of said output signal delaying application to said one stage of said changed output signal to produce an output from said rate-responsive amplifier of large magnitude, and means responsive to said output from said rate-responsive amplifier for disabling said electronic discharge means to interrupt the supply of high-frequency power to said heating electrodes.

2. The system of claim 1 in which said electronic discharge means includes a grid-excitation circuit and in which said means for disabling said electronic discharge means comprises a switch having switch contacts in said grid circuit and an operating coil responsive to said output from said rate-responsive amplifier for producing high-speed operation of said switch from a closed position to an open position to open said grid circuit.

3. A system for protecting a dielectric heating system and its electronic discharge means from effects of arcing and incipient arcing between its heating electrodes, comprising rectifying means electrically connected to the heating electrodes and responsive to the voltage between the electrodes for producing a unidirectional signal varying in time and magnitude with change in voltage between the heating electrodes, a clamping circuit responsive to said unidirectional signal for producing a signal pulse representative of arcing and incipient arcing between said heating electrodes, a rate-responsive amplifier having a pair of thermionic tubes, each of said tubes having a grid circuit connected to receive said signal pulse, said tubes having outputs of substantially equal magnitude during normal rates of change in the magnitude of said pulse, one of said grid circuits including a time-delay network for delaying the application of said signal pulse to said one of said grid circuits to produce a difference in the outputs of said thermionic tubes, said difference in outputs comprising a control signal, and means responsive to said control signal for disabling said electronic discharge means to interrupt the supply of high-frequency power to said heating electrodes.

4. In a high-frequency dielectric heating system having spaced electrodes in a load circuit for heating work disposed therebetween and including a source of high-frequency power having a power tube, an associated grid excitation circuit, including a grid-return path, and a power output circuit for supplying high frequency power to said load circuit, the combination of a protective system for protecting said tube and associated electrical components from damage incident to corona and arcing between said electrodes, said protective system comprising a voltage-sensing detector responsive to the voltage between said electrodes, said detector having circuit components for producing a detector output signal when the magnitude of said voltage across said electrodes is abnormally changing at a rate greater than during normal operation of the heating system, a switch included in said grid circuit, an operating coil for producing high-speed operation of said switch from a closed position to an open position, a normally non-conductive thermionic means, circuit means for applying to said thermionic means said detector output signal for rendering said thermionic means conductive, and an energizing circuit for said coil completed by way of said thermionic means for producing said high-speed operation of said switch for opening said grid-return path thereby to interrupt the supply of high-frequency power to said heating electrodes.

5. The method of protecting a high-frequency dielectric heating system and its associated electrical components from damage incident to arcing and incipient arcing between two heating electrodes thereof, which comprises generating a control signal whenever the rate of change of electrode voltage across the heating electrodes exceeds a predetermined value, upon occurrence of said signal closing a discharge circuit from electrical storage means for flow of current through at least a part of a control circuit of a control tube of said system to render said tube non-conductive to interrupt the flow of power to the heating electrodes, during the time interval of flow of said current opening the power supply to said tube, during the time the power supply to the tube is open restoring said electrical energy withdrawn from said storage means, and after said restored energy has reached a predetermined level adequate again to render said tube non-conductive closing said power supply for resumption of operation of the high-frequency dielectric heating system.

6. The method of protecting the power tube and associated electrical components of a high-frequency dielectric heating system from damage incident to arcing between heating electrodes thereof, which comprises generating a control signal whenever the voltage across the heating electrodes decreases at a rate exceeding a predetermined value corresponding with normal operation of the heating system, upon generation of said signal releasing stored electrical energy for production of flow of current through at least a part of a control circuit of said tube to render said tube non-conductive to interrupt the flow of power to said heating electrodes, interrupting the power supply circuit of said tube, while said power supply circuit is interrupted restoring said stored electrical energy, and when said stored signal has been restored to a condition adequate for reproduction of said flow of current upon subsequent arcing between the heating electrodes closing said power supply circuit.

7. In a high-frequency dielectric heating system having heating electrodes, a power tube, a control circuit for said tube and a power supply circuit for said tube, the combination of means for preventing damage to said power tube and associated electrical components incident to arcing between heating electrodes thereof, comprising a detector responsive to the rate of change of voltage between said heating electrodes for generating a control signal whenever said rate of change of electrode voltage due to the incipient formation of, or the presence of, an arc exceeds a predetermined value, means responsive to said control signal for closing a discharge circuit including a part of said control circuit for production therein of a flow of current to render said tube non-conductive immediately to interrupt the flow of power to said heating electrodes, means operable at a time interval after initiation of said flow of current for opening said power supply circuit to said tube, and means for returning said discharge circuit to a condition such that upon recurrence of an arc between said electrodes it will reproduce said flow of current, said power supply opening means thereafter closing said power supply circuit.

8. A protection system for protecting a high-frequency dielectric heating system from damage as the result of arcing or incipient arcing between heating electrodes thereof, comprising means for generating a control signal whenever the magnitude of electrode voltage across the heating electrodes due to the presence of an arc decreases at a rate exceeding a predetermined value, energy-storage means, means responsive to said control signal for closing a discharge circuit for production of flow of current from said energy-storage means, electronic switch means responsive to said flow of current for interrupting the flow of power to said heating electrodes to extinguish the arc, means responsive at a time interval after initiation of said flow of current for maintaining interrupted the flow of power to said heating electrodes, and charging means for recharging said energy-storage means during the time that said power is maintained interrupted, said means maintaining said power interrupted being responsive to attainment by said energy-storage means of a predetermined charge for restoring the flow of power to said heating electrodes for resumption of operation of the high-frequency dielectric heating system.

9. In a high-frequency dielectric heating system having heating electrodes, a power tube for supplying high-frequency power to said electrodes, said power tube having a grid circuit including a biasing resistor, the combination of a protective system for protecting said power tube and associated electrical components from damage incident to arcing or incipient arcing between said heating electrodes, comprising means responsive to the voltage between said electrodes for producing a control signal whenever the magnitude of electrode voltage across the heating electrodes decreases at a rate indicative of the presence, or the incipient formation, of an arc between said electrodes, an electronic switch, energy-storage means, circuit connections for applying said control signal to said electronic switch to close said switch to connect said energy-storage means in series with said biasing resistor for flow of current therefrom through said grid-biasing resistor to interrupt the flow of high-frequency power from said power tube to said heating electrodes, switch means operative upon discharge of said energy-storage means to a predetermined level for preventing flow of high-frequency power, and charging means for recharging said energy-storage means during the time that the high-frequency power is interrupted, said circuit means in response to a level of charge of said energy-storage means adequate to produce bias of said power tube to interrupt the flow of high-frequency power from said power tube initiating again the operation of the high-frequency dielectric heating system.

10. In a high-frequency dielectric heating system having heating electrodes, a power tube for supplying high-frequency power to said heating electrodes, said power tube having a grid circuit including a biasing resistor and a power supply circuit for said power tube, the combination of a protective system for protecting said power tube and associated electrical components including said power supply circuit from damage incident to incipient arcing or actual arcing between said heating electrodes, comprising means responsive to the voltage between said electrodes for producing a control signal whenever the electrode voltage across the heating electrodes decreases at a rate indicative of the presence of, or the incipient formation of, an arc between them, a control tube having an open plate-cathode circuit, a capacitor, said capacitor and said grid-biasing resistor being in said open plate-cathode circuit, said control tube being responsive to said control signal for closing said plate-cathode circuit for flow of current from said capacitor through said grid-biasing resistor to bias said power tube to cut-off to interrupt the flow of high-frequency power to said heating electrodes, switch means operative upon discharge of said capacitor for opening said power circuit, charging means for recharging said capacitor during the time that the high-frequency power is interrupted, and means responsive to a predetermined level of charge of said capacitor for closing said switch means to restore the supply of said high-frequency power through said power tube.

11. In a high-frequency dielectric heating system having heating electrodes, a tube for controlling the supply of high-frequency power to said electrodes, a grid circuit of said tube including a biasing resistor, the combination of a protective system for protecting said heating system from damage incident to incipient arcing or arcing between said heating electrodes, comprising means responsive to the voltage between said electrodes for producing a control signal concurrently with decrease of the magnitude of electrode voltage at a rate indicative of the presence of or the incipient formation of an arc between said electrodes, a thyratron having an open plate-cathode circuit, a capacitor connected in said plate-cathode circuit in series with said grid-biasing resistor, said thyratron being responsive to said control signal for closing said plate-cathode circuit for flow of current from said capacitor through said grid-biasing resistor to bias said tube to cut-off to interrupt the flow of high-frequency power to said heating electrodes, circuit means operative upon discharge of said capacitor for maintaining interrupted the flow of high-frequency power, means including a rectifier for recharging said capacitor during the time that the said power is interrupted, and means responsive to a predetermined level of charge on said charging means for actuating said circuit means to restore the supply of said high-frequency power to said heating electrodes.

References Cited in the file of this patent

UNITED STATES PATENTS

| | | |
|---|---|---|
| 2,426,579 | Peckam | Aug. 26, 1947 |
| 2,548,246 | Walstrom | Apr. 10, 1951 |
| 2,707,742 | Juhola | May 3, 1955 |
| 2,763,758 | Kohler | Sept. 18, 1956 |
| 2,785,264 | Gillespie et al. | Mar. 12, 1957 |
| 2,786,926 | Rothstein et al. | Mar. 26, 1957 |
| 2,792,483 | Kinn et al. | May 14, 1957 |